United States Patent
Yamanaka et al.

(10) Patent No.: US 11,214,197 B2
(45) Date of Patent: Jan. 4, 2022

(54) VEHICLE SURROUNDING AREA MONITORING DEVICE, VEHICLE SURROUNDING AREA MONITORING METHOD, VEHICLE, AND STORAGE MEDIUM STORING PROGRAM FOR THE VEHICLE SURROUNDING AREA MONITORING DEVICE

(71) Applicant: HONDA MOTOR CO., LTD., Tokyo (JP)

(72) Inventors: Hiroshi Yamanaka, Wako (JP); Megumi Kageyama, Wako (JP); Chihiro Kajihara, Wako (JP); Eiichi Hoshino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/118,713

(22) Filed: Dec. 11, 2020

(65) Prior Publication Data

US 2021/0178969 A1 Jun. 17, 2021

(30) Foreign Application Priority Data

Dec. 13, 2019 (JP) .............................. JP2019-225956

(51) Int. Cl.
*B60R 1/00* (2006.01)
*H04N 7/18* (2006.01)
*G08G 1/16* (2006.01)

(52) U.S. Cl.
CPC .............. *B60R 1/00* (2013.01); *G08G 1/168* (2013.01); *H04N 7/181* (2013.01);
(Continued)

(58) Field of Classification Search
CPC . B60R 1/00; B60R 2300/20; B60R 2300/802; B60R 2300/607;
(Continued)

(56) References Cited

U.S. PATENT DOCUMENTS 9,087,256 B2 * 7/2015 Yu .......................... G06T 3/4038
9,826,200 B2 * 11/2017 Stein ...................... H04N 7/183
(Continued)

FOREIGN PATENT DOCUMENTS

JP 4807104 B2 11/2011
JP 2014-072604 A 4/2014
JP 2017-126834 A 7/2017

OTHER PUBLICATIONS

Office Action received in corresponding Japanese application No. 2019-225956 dated Nov. 2, 2021 with English translation (7 pages).

*Primary Examiner* — James M Pontius
(74) *Attorney, Agent, or Firm* — Rankin, Hill & Clark LLP

(57) ABSTRACT

A vehicle surrounding area monitoring device comprises a processor including a top perspective view image producing section taking images of a surrounding area of a vehicle and synthesizing the images into a top perspective view image and displaying the top perspective view image on a display. The processor further includes a vehicle running direction information receiving section receiving information on a direction in which the vehicle is running from a control device to control the vehicle to run frontward or rearward. The top perspective view image producing section produces a frontward top perspective view image of the vehicle and the surrounding area seen from a viewing point upward and rearward of the vehicle when the vehicle is running frontward and a rearward top perspective view image of the vehicle and the surrounding area seen from another viewing
(Continued)

point upward and frontward of the vehicle when the vehicle is running rearward.

8 Claims, 8 Drawing Sheets

(52) U.S. Cl.
CPC ..... *B60R 2300/105* (2013.01); *B60R 2300/20* (2013.01); *B60R 2300/303* (2013.01); *B60R 2300/607* (2013.01); *B60R 2300/802* (2013.01); *B60R 2300/806* (2013.01); *B60R 2300/8093* (2013.01)

(58) Field of Classification Search
CPC ...... B60R 2300/806; B60R 2300/8093; B60R 2300/105; B60R 2300/303; G08G 1/168; H04N 7/181
See application file for complete search history.

(56) References Cited

U.S. PATENT DOCUMENTS

| | | | | |
|---|---|---|---|---|
| 9,956,913 | B2* | 5/2018 | Nakasho | B60R 1/00 |
| 10,523,865 | B2* | 12/2019 | Appia | B60R 1/00 |
| 10,710,504 | B2* | 7/2020 | Nakasho | B60R 1/00 |
| 10,737,724 | B2* | 8/2020 | Choi | B62D 15/0285 |
| 10,882,450 | B2* | 1/2021 | Maejima | H04N 7/181 |
| 2003/0165255 | A1* | 9/2003 | Yanagawa | G06T 3/00 382/104 |
| 2003/0197660 | A1* | 10/2003 | Takahashi | G06K 9/00791 345/7 |
| 2007/0285549 | A1* | 12/2007 | Takano | B60R 1/00 348/333.01 |
| 2009/0086047 | A1* | 4/2009 | Suehiro | H04N 5/232939 348/222.1 |
| 2012/0127312 | A1* | 5/2012 | Nagamine | B60R 1/00 348/148 |
| 2013/0010118 | A1* | 1/2013 | Miyoshi | H04N 7/181 348/148 |
| 2014/0152827 | A1* | 6/2014 | Yamamoto | G06T 3/4038 348/148 |
| 2014/0354816 | A1* | 12/2014 | Inanobe | B60R 1/002 348/148 |
| 2016/0006932 | A1* | 1/2016 | Zhang | G06T 3/0093 348/222.1 |
| 2017/0018070 | A1* | 1/2017 | Onuma | G06T 7/11 |
| 2017/0061622 | A1* | 3/2017 | Sakano | G06K 9/00744 |
| 2017/0113614 | A1* | 4/2017 | Fluegel | H04N 7/181 |
| 2018/0322349 | A1* | 11/2018 | Hayakawa | B60R 21/00 |
| 2019/0009720 | A1 | 1/2019 | Omiya et al. | |
| 2019/0047472 | A1* | 2/2019 | Chaaya | G06K 9/00798 |
| 2019/0087665 | A1* | 3/2019 | Yokota | H04N 7/18 |
| 2019/0102634 | A1* | 4/2019 | Sagami | G06K 9/00825 |
| 2019/0164333 | A1* | 5/2019 | Fukushima | G06T 15/205 |
| 2020/0081612 | A1* | 3/2020 | Yamamoto | G06F 3/04845 |
| 2020/0082185 | A1* | 3/2020 | Yamamoto | B60R 1/002 |
| 2020/0139888 | A1* | 5/2020 | Yamamoto | B60R 1/00 |
| 2020/0195839 | A1* | 6/2020 | Sung | H04N 5/232945 |
| 2020/0238909 | A1* | 7/2020 | Yamamoto | B60R 1/00 |
| 2020/0238921 | A1* | 7/2020 | Matsuba | H04N 7/181 |
| 2020/0398825 | A1* | 12/2020 | Tsujino | B60W 10/20 |
| 2020/0398826 | A1* | 12/2020 | Tsujino | B60K 37/06 |
| 2020/0398865 | A1* | 12/2020 | Tsujino | B60R 1/002 |
| 2021/0023994 | A1* | 1/2021 | Watanabe | B60R 1/00 |
| 2021/0078496 | A1* | 3/2021 | Yamamoto | B62D 15/028 |
| 2021/0081684 | A1* | 3/2021 | Yamamoto | B62D 15/0275 |

* cited by examiner

VEHICLE SURROUNDING AREA MONITORING DEVICE, VEHICLE SURROUNDING AREA MONITORING METHOD, VEHICLE, AND STORAGE MEDIUM STORING PROGRAM FOR THE VEHICLE SURROUNDING AREA MONITORING DEVICE

CROSS REFERENCE TO RELATED APPLICATIONS

This application claims the foreign priority benefit under 35 U.S.C. § 119 of Japanese Patent Application No. 2019-225956 filed on Dec. 13, 2019, the disclosure of which is incorporated herein by reference.

TECHNICAL FIELD OF THE INVENTION

The present invention relates to a vehicle surrounding area monitoring device, a vehicle, a vehicle surrounding area monitoring method and a storage medium storing a program for the vehicle surrounding area monitoring device.

BACKGROUND OF THE INVENTION

There have been more and more vehicles with an automatic parking system that is equipped with cameras and sonars to show a surrounding area of the vehicle on a display and detect an obstacle in the surrounding area to stop the vehicle and is intended to automatically park the vehicle at a designated parking position.

JP4807104B2 discloses a vehicle surrounding area monitoring system to show images taken by cameras of the surrounding area of the vehicle.

This vehicle surrounding area monitoring system is configured to display a top overview image of a whole vehicle surrounding area that is synthesized from images taken by plural in-vehicle cameras of the whole vehicle surrounding area and could be seen from a virtual viewing point upward of the vehicle. In addition, if an obstacle is detected by a sonar in an overlapped area of which duplicative images are taken by a couple of adjacent in-vehicle cameras, a warning image consisting of raw images of the overlapped area taken by the in-vehicle cameras.

The vehicle surrounding area monitoring system above mentioned switches from the top overview image (top plan view image) to raw images if an obstacle is detected. There is also a top perspective view image used as an image for a driver to recognize a state of a surrounding area around a vehicle. However, JP4807104B2 does not describe anything about how the top perspective view image is utilized when an obstacle is detected.

The present invention has an objective to warn a driver of an obstacle in the top perspective view image when an obstacle is detected.

SUMMARY OF THE INVENTION

A vehicle surrounding area monitoring device of the present invention has an aspect of comprising a processor that comprises a top perspective view image producing section synthesizing images of a surrounding area of a vehicle taken by plural imaging devices into a top perspective view image of the vehicle and the surrounding area of the vehicle that are seen from a viewing point obliquely upward of the vehicle and displaying the top perspective view image on a display device and a running direction information receiving section receiving information on a running direction of the vehicle from a control device to control the vehicle to run either frontward or rearward, wherein the top perspective view image producing section produces a frontward top perspective view image of the vehicle and the surrounding area of the vehicle that are seen from a first viewing point upward and rearward of the vehicle when the vehicle is running frontward, and produces a rearward top perspective view image of the vehicle and the surrounding area of the vehicle that are seen from a second viewing point upward and frontward of the vehicle when the vehicle is running rearward.

The present invention enables warning a driver of an obstacle in the top perspective view image when the obstacle is detected.

DETAILED DESCRIPTION OF THE EMBODIMENT

Hereinafter, a vehicle surrounding area monitoring system of an embodiment of the present invention is explained. The vehicle surrounding area monitoring system is configured to take images of a surrounding area of a vehicle and synthesize the taken images into a top perspective view image of the vehicle and the surrounding area of the vehicle that are seen from a viewing point located obliquely upward of the vehicle. The vehicle surrounding area monitoring system synthesizes the taken images into a top perspective view image (that may be also referred to as "a frontward top perspective view image") of the vehicle and the vehicle surrounding area that are seen from a viewing point located rearward and upward of the vehicle, when the vehicle is running frontward. In addition, the vehicle surrounding area monitoring system synthesizes the taken images into a top perspective view image (that may be also referred to as "a rearward top perspective view image") of the vehicle and the vehicle surrounding area that are seen from a viewing point located frontward and upward of the vehicle, when the vehicle is running rearward.

Furthermore, the vehicle surrounding area monitoring system is configured to detect an obstacle (other vehicle or a person) in the surrounding area around the vehicle approaching a driver's vehicle with a LIDAR, a radar or a sonar and superimpose an image indicating a direction of the obstacle (obstacle direction mark) in the frontward top perspective view image (put the obstacle direction mark in the frontward top perspective view image), when the vehicle is running frontward. When the vehicle is running rearward, the vehicle surrounding area monitoring system does not add a direction of the obstacle into the rearward top perspective view image, because a driver could be mistaken about the direction of the obstacle looking at the rearward top perspective view image with the direction of the obstacle. On the other hand, the rearward top perspective view image adds the direction of the obstacle into the top plan view image, whether the vehicle is running frontward or rearward.

<Configuration of Vehicle Surrounding Area Monitoring System>

Figure 1:
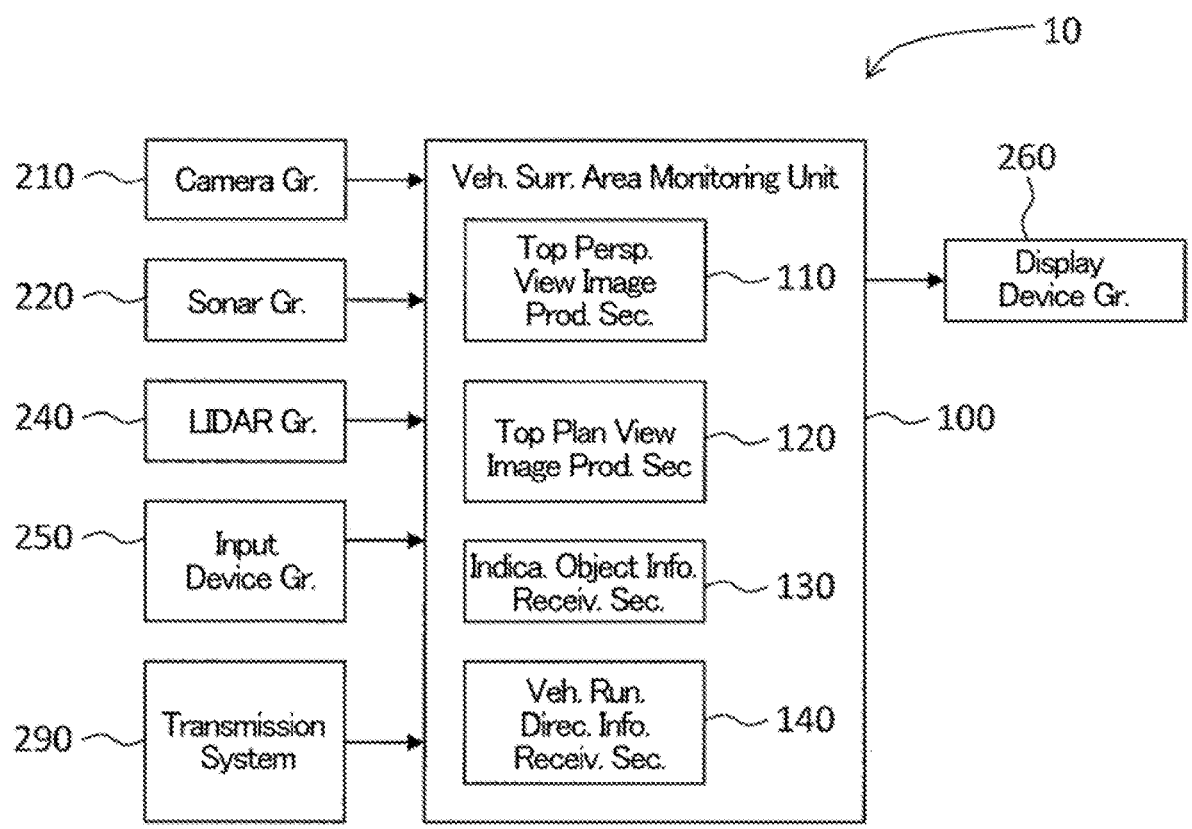
FIG. 1 is a block diagram to schematically indicate a system configuration of a vehicle surrounding area monitoring system of an embodiment of the present invention.
Figure 2:
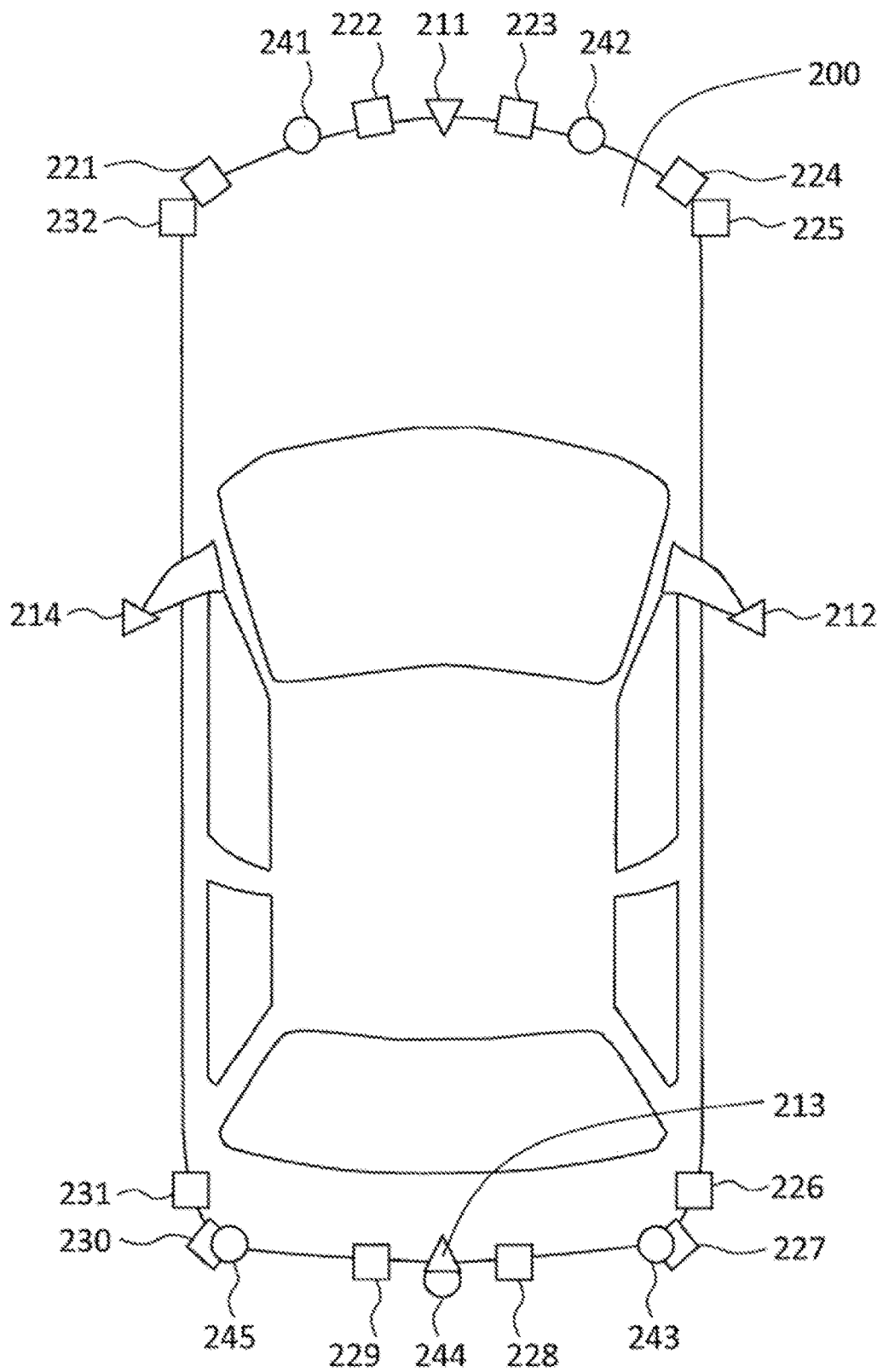
FIG. 2 shows a top plan view of a vehicle equipped with the vehicle surrounding area monitoring system of the embodiment.
Figure 3:
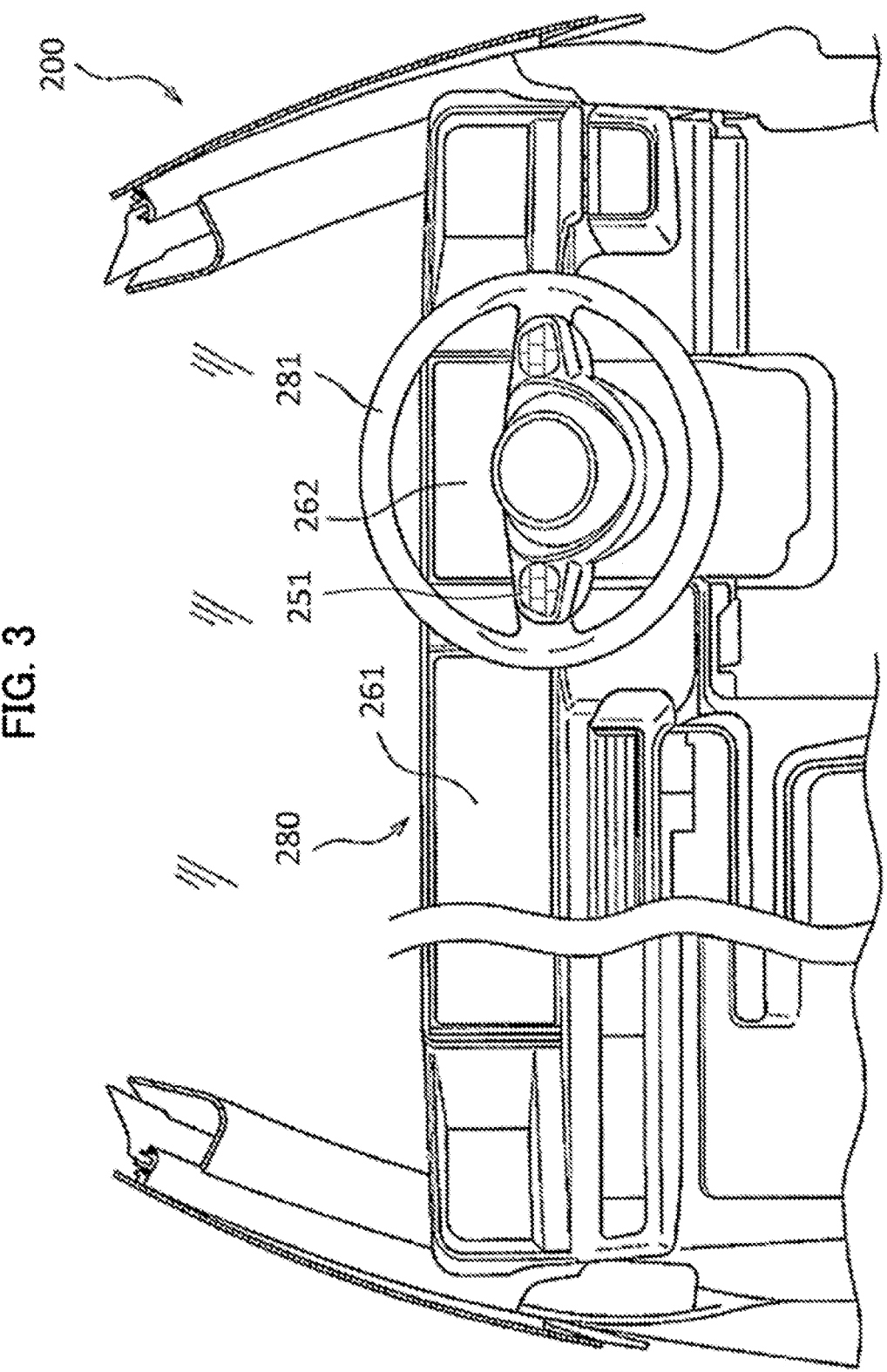
FIG. 3 shows a configuration of a dashboard of the vehicle of the embodiment.

FIG. 1 is a block diagram showing a system configuration of a vehicle surrounding area monitoring system 10 of an embodiment of the present invention. FIG. 2 is a top plan view of a vehicle 200 equipped with the vehicle surrounding area monitoring system 10 of the embodiment. FIG. 3 shows a configuration of a dashboard 280 of the vehicle 200 of the embodiment. The configuration of the vehicle surrounding area monitoring system 10 is explained with reference to FIG. 1~FIG. 3.

As shown in FIG. 1, the vehicle surrounding area monitoring system 10 includes a vehicle surrounding area monitoring unit 100, a camera group 210, a sonar group 220, a LIDAR group 240, an input device group 250, a display device group 260 and a transmission system 290. The camera group 210, the sonar group 220, the LIDAR group 240, the input device group 250, the display device group 260 and the transmission system 290 are wire-connected directly or through a CAN (Controller Area network) with the vehicle surrounding area monitoring unit 100.

<Configuration of Vehicle Surrounding Area Monitoring System: Camera>

The camera group 210 consists of cameras 211~214 attached to the vehicle 200 as shown in FIG. 2. To be specific, the vehicle 200 includes the camera 211 attached to a front portion of the vehicle 200 to take an image of a frontward area of the vehicle 200 and the camera 213 attached to a rear portion of the vehicle 200 to take an image of a rearward area of the vehicle 200.

The vehicle 200 of the embodiment further includes the camera 212 attached to a tip portion of a right side mirror of the vehicle 200 to take an image of a right side area of the vehicle 200 and the camera 214 attached to a tip portion of a left side mirror of the vehicle 200 to take an image of a left side area of the vehicle 200. The cameras 212, 214 may be attached to other portions of the vehicle 200 and are attached preferably at such positions that the side mirrors are not seen as relatively large images respectively in images taken by the cameras 212, 214. The images taken by the cameras 211~214 are outputted to the vehicle surrounding area monitoring unit 100.

<Configuration of Vehicle Surrounding Area Monitoring System: Sonar>

The sonar group 220 consists of sonars 221 to 232 as shown in FIG. 2 which are attached to the vehicle 200 and intended to detect an obstacle present a relatively short distance away from the vehicle 200 (detecting a distance). To be specific, four sonars 221 to 224 are attached to the front side of the vehicle 200 at nearly equal intervals. The four sonars 221 to 224 detect an obstacle present frontward of the vehicle 200. Four sonars 227 to 230 are attached to the rear side of the vehicle 200 at nearly equal intervals. The four sonars 227 to 230 detect an obstacle present rearward of the vehicle 200.

In addition, a sonar 225 is attached to a front portion of a right side of the vehicle 200 and detects an obstacle present in an area on the right side of and frontward of the vehicle 200 and in an area on the right side of a front portion of the vehicle 200. A sonar 226 is attached to a rear portion of a right side of the vehicle 200 and detects an obstacle present in an area on the right-side of and rearward of the vehicle and in an area on the right side of a rear portion of the vehicle 200. In addition, a sonar 232 is attached to a front portion of a left side of the vehicle 200 and detects an obstacle present in an area on the left of and frontward of the vehicle 200 and in an area on the left side of the front portion of the vehicle 200. A sonar 231 is attached to a rear portion of the left side of the vehicle 200 and detects an obstacle present in an area on the left side of and rearward of the vehicle 200 and in an area on the left side of the rear portion of the vehicle 200. The sonars 225, 226, 231, 232 that are attached to the right and left sides of the vehicle 200 detect such an obstacle that is located a relatively short distance away from the vehicle 200 and could interfere with the vehicle 200. Information on the obstacle detected by the sonars 221~232 is outputted to the vehicle surrounding area monitoring unit 100. The sonars 221~232 of the sonar group 220 are intended to detect an object a relatively short distance away from the vehicle 200.

<Configuration of Vehicle Surrounding Area Monitoring System: LIDAR>

The LIDAR group 240 (LIDAR: Light Detection and Ranging) consists of plural LIDARs 241~245. The LIDARs 241~245 emit laser light toward indicative objects including a vehicle and a person that are present frontward of the LIDARs 241~245 and receive reflected laser light from the indicative objects to obtain information on a distribution of the indicative objects including a distance to each object and an orientation of each object (which is referred to as detecting an object). In addition to the LIDAR group 240 or alternatively, a radar group using a micrometer wave, or a millimeter wave may be appropriately used.

The vehicle 200 of the embodiment has LIDARs 241, 242 attached to a front portion of the vehicle 200 to detect an indicative object that is present frontward of the vehicle 200. In addition, the vehicle 200 has LIDARs 243~245 attached to a rear portion of the vehicle 200 at nearly equal intervals to detect an indicative object that is present rearward of the vehicle 200.

Information on the indicative object detected by the LIDARS 241~245 is outputted to the vehicle surrounding area monitoring unit 100.

The numbers of cameras, sonars and LIDARs and their attaching positions are not limited to those mentioned above. The numbers may be increased or decreased, and their attaching positions may be changed. However, the numbers of cameras, sonars and LIDARs and their attaching positions are preferably selected so that the state outside the whole outer periphery of the vehicle 200 can be detected.

<Configuration of Vehicle Surrounding Area Monitoring System: Display Device, Input Device and Transmission System>

The display device group 260 (See FIG. 1) is mounted on the dashboard 280 (See FIG. 3) to provide passengers in a vehicle compartment with various pieces of information and consists of display devices 261~262 that are preferably touch panel type display devices. The display device 262 is mounted on a portion of the dashboard 280 opposite a driver seat and displays a speed-meter, a tachometer, a odometer, shift position information, information on whether each of illumination devices is turned on or not, and the like.

The display device 261 is elongated in the vehicle width direction and is a multi-information panel that shows map information around the vehicle 200, current position information of the vehicle 200 in the map, traffic information (including information on a traffic light) on a road along which the vehicle 200 is currently running and a road along which the vehicle 200 is to run, and the like. In addition, the display device 261 displays the top perspective view image and the top plan view image as well (See FIG. 7 and FIG. 8 to be described later).

As shown in FIG. 1, the input device group 250 is mounted on the dashboard 280 and/or a steering wheel 281 (See FIG. 3). When any of the display devices 261, 262 is a touch panel display, it should be included in the input device group 250. A MVC switch (Multi View Camera Switch) 251 is an input device to be installed on the steering wheel 281. When the MVC switch is switched on, both the top perspective view image and the top plan view image are displayed on the display device 261.

A transmission system 290 (that may be also referred to as "control device") is a system to perform a shift operation of the vehicle 200. The transmission system 290 is connected with a shift lever (not shown) and outputs a position of the shift lever to the vehicle surrounding area monitoring unit 100.

<Configuration of Vehicle Surrounding Area Monitoring System: Vehicle Surrounding Area Monitoring Unit>

The vehicle surrounding area monitoring unit 100 includes an ECU (Electronic Control Unit) and is configured to perform an operation based on a control program to fulfill functions of a top perspective view image producing section 110, a top plan view image producing section 120, an indicative object information receiving section 130 and a running direction information receiving section 140. The control program (that may be also referred as simply as "program") is stored in the vehicle surrounding area monitoring unit 100. Here, the vehicle surrounding area monitoring unit 100 inclusive of the top perspective view image producing section 110, the top plan view image producing section 120, the indicative object information receiving section 130 and the running direction information receiving section 140 may be also referred to as a control section.

The top perspective view image producing section 110 is configured to synthesize the images taken by the camera group 210 into a top perspective view image and outputs the top perspective view image to the display device 261. There are a couple of the top perspective view images. One is a frontward top perspective view image of the vehicle 200 and its surrounding area that are seen from a viewing point located rearward and upward of the vehicle 200 (See a frontward top perspective view image 311 in FIG. 7 to be described later). The other is a rearward top perspective view image of the vehicle 200 and its surrounding area that are seen from a viewing point located frontward and upward of the vehicle 200 (See a rearward top perspective view image 321 in FIG. 8 to be described later).

The top plan view image producing section 120 is configured to synthesize the images taken by the camera group 210 into top plan view images 312, 322 of the vehicle 200 and its surrounding area that are seen from a viewing point located just upward of the vehicle 200 (See FIG. 7 and FIG. 8 to be described later).

The indicative object information receiving section 130 is configured to output an direction of an indicative object (other vehicle or a person) to the top perspective view image producing section 110 and the top plan view image producing section 120, if information on the indicative object detected by the LIDAR group 240 (LIDARs 241~245) includes a piece of information on the indicative object that is within a predetermined area from the vehicle 200 and is approaching the vehicle 200 (driver's vehicle). Here, the predetermined area is a surrounding area of the vehicle 200 that is within a predetermined distance from the vehicle 200 and out of the area around the vehicle 200 shown by the top perspective view image and the top plan view image.

In this regard, the images (a frontward top perspective view image 311 and a top plan view image 312) shown in FIG. 7 to be described later have a displayed area that is limited especially in the left-right (width) direction because of a limitation of a display space. Therefore, according to the present embodiment, an indicative object, which is not shown (not shown) in the frontward top perspective view image 311 due to the limitation of the displayed area of the frontward top perspective view image 311, is indicated by an arrow if the LIDAR group 240 detects the indicative object approaching the vehicle 200.

In addition, the indicative object information receiving section 130 is configured to output information on an indicative object that could interfere with a direction in which the vehicle 200 running, the indicative object including such an object as is about to cross an rearward area on the rear side of the vehicle 200 running rearward. However, the indicative object information receiving section 130 does not output information on such an indicative object as is at a still or is going further away from the vehicle 200.

The top perspective view image producing section 110 produces the frontward top perspective view image 311 that can include an obstacle direction mark 313 (See FIG. 7 to be described later) indicating a direction in which an obstacle is present. In addition, the top plan view image producing section 120 produces the top plan view images 312, 322 that can include 314, 324 (See FIG. 7 and FIG. 8 to be described later) indicating a direction in which an obstacle is present. On the other hand, the top perspective view image 321 produced by the top perspective view image producing section 110 does not include an obstacle direction mark (See FIG. 8 to be described later).

The running direction information receiving section 140 receives the position of the shift lever from the transmission system 290 and determines whether the vehicle 200 is running frontward or rearward. For instance, when the shift lever is at a frontward running position (for example, D-range), the running direction information receiving section 140 determines that the vehicle 200 is running frontward even if the vehicle 200 is at a stop.

<Vehicle Surrounding Area Monitoring Operation>

Before an operation of the vehicle surrounding area monitoring system 10 is described, an operation procedure of the vehicle surrounding area monitoring system 10 is described. When a driver switches on the MVC switch 251 (See FIG. 3), the top perspective view image and the top plan view image are displayed on the display device 261. When the shift lever is at the frontward running position, the frontward top perspective view image is displayed. On the other hand, when the shift lever is at a rearward running position, the rearward top perspective view image is displayed. When the shift lever is at the rearward running position, the rearward top perspective view image is displayed even if the MVC switch is kept off.

Figure 4:
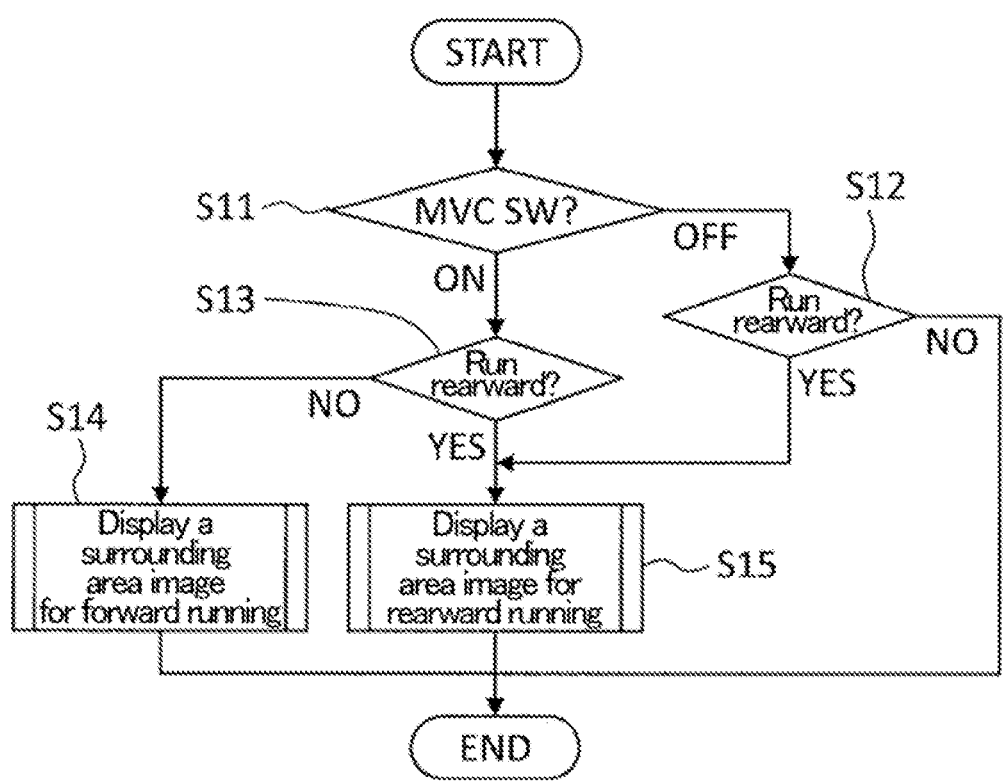
FIG. 4 is a flowchart of a vehicle surrounding area monitoring operation of the embodiment.

FIG. 4 is a flowchart of the vehicle surrounding area monitoring operation of the embodiment. The vehicle surrounding area monitoring operation starts on the MVC switch 251 (that is indicated as "MVC SW" in FIG. 4) being switched on or on the shift lever being shifted to the rear running position.

In Step S11, the control section (vehicle surrounding area monitoring unit 100) has the operation proceed to Step S13 if the MVC switch 251 ("MVC SW" in FIG. 4) is on (ON in Step S11) and to Step S12 if the MVC switch 251 is off (OFF in Step S11).

In Step S12, the control section has the operation proceed to Step S15 if the running direction information receiving section 140 determines that the vehicle 200 is running rearward (YES in Step S12) and ends the operation if the running direction information receiving section 140 does not determine that the vehicle 200 is running rearward (NO in Step S12).

In Step S13, the control section has the operation proceed to Step S15 if the running direction information receiving section 140 determines that the vehicle 200 is running rearward (YES in Step S13) and to Step S14 if the running direction information receiving section 140 does not determine that the vehicle 200 is running rearward (NO in Step S13).

A display operation for a frontward running vehicle surrounding area image in Step S14 is explained with reference to FIG. 5 to be described later.

A display operation for a rearward running vehicle surrounding area image in Step S15 is explained with reference to FIG. 6 to be described later.

Figure 5:
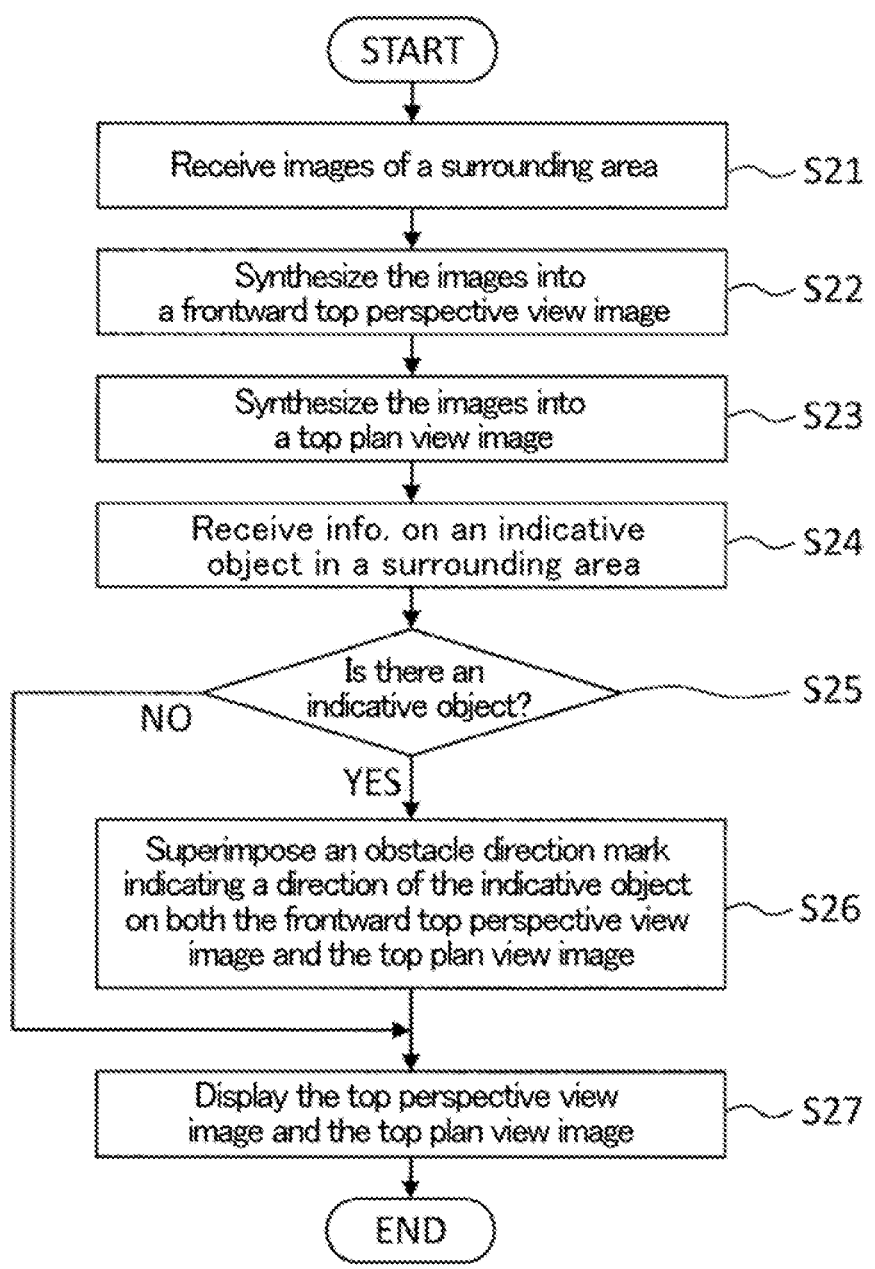
FIG. 5 is a flowchart of a display operation of a frontward running vehicle surrounding area image of the embodiment.

FIG. 5 is a flowchart of the display operation for a frontward running vehicle surrounding area image of the embodiment.

In Step S21, the control section receives images of the vehicle surrounding area from the camera group 210.

In Step S22, the top perspective view image producing section 110 synthesizes the images of the vehicle surrounding area received in Step S21 into a frontward top perspective view image.

In Step S23, the top plan view image producing section 120 synthesizes the images of the vehicle surrounding area received in Step S21 into a top plan view image. Step S22 and Step S23 may be performed in the reversed order.

In Step S24, the indicative object information receiving section 130 receives information on an indicative object detected by the LIDAR group 240.

In Step S25, the indicative object information receiving section 130 has the operation proceed to Step S26 if there is an indicative object (YES in Step S25) of the indicative objects whose information is received in Step S24 that is present within the predetermined area from the vehicle 200 and is approaching the vehicle 200 (or interfering with the direction in which the vehicle 200 running) and to Step S27 if there is no such an indicative object (NO in Step S25). The predetermined area is a surrounding area of the vehicle 200 that is within a predetermined distance from the vehicle 200 and out of the area around the vehicle 200 shown by the top perspective view image and the top plan view image An order to perform Step S22 of synthesizing the taken images into the top perspective view image, Step S23 of synthesizing the taken images into the top plan view image and Step S25 of determining if the indicative object is present is not limited to this procedure and these steps may be performed in a different order. Alternatively, Steps S22, S23, S25 may be simultaneously performed.

In Step s26, the indicative object information receiving section 130 notifies the top perspective view image producing section 110 and the top plan view image producing section 120 of a direction in which the indicative object within the predetermined area is present. Next, the top perspective view image producing section 110 superimposes an obstacle direction mark 313 indicating the direction in which the indicative object is present (See FIG. 7) on the top perspective view image produced in Step S22. In addition, the top plan view image producing section 120 superimposes an obstacle direction mark 314 indicating the direction in which the indicative object is present (See FIG. 7) on the top plan view image produced in Step S23.

In Step S27, the top perspective view image producing section 110 and the top plan view image producing section 120 display respectively the top perspective view image and the top plan view image which are respectively produced on the display device 261. The displayed images are explained later with reference to FIG. 7.

Figure 6:
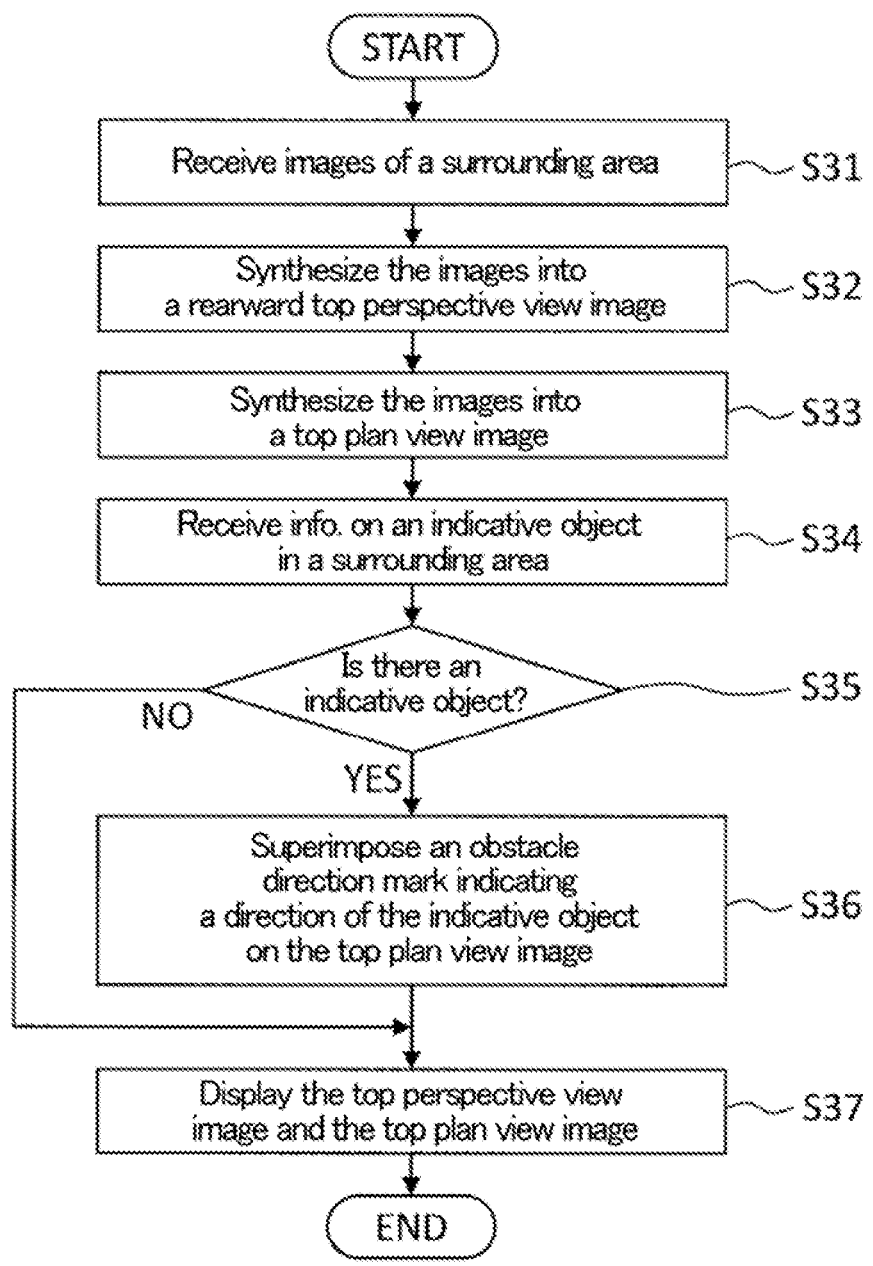
FIG. 6 is a flowchart of a display operation of a rearward running vehicle surrounding area image of the embodiment.

FIG. 6 is a flowchart of a display operation of a rearward running vehicle surrounding area image. Steps S31~S37 except for Steps S32, S36 are respectively the same as Steps S21~S27 (See FIG. 5).

In Step S32, the top perspective view image producing section 110 produces a rearward top perspective view image instead of the frontward perspective view image. Step S32 and Step S33 may be performed in the reversed order. As is the case with the procedure of the display operation of the frontward running vehicle surrounding area image, Step S32, Step S33 and Step S35 may be performed in a different order from the order described in FIG. 6 or performed simultaneously.

In Step S36, the indicative object information receiving section 130 notifies only the top plan view image producing section 120 of the direction in which the indicative object within the predetermined area is present. Next, the top plan view image producing section 120 superimposes an obstacle direction mark 324 (See FIG. 8) indicating a direction in which the indicative object is present on the top plan view image produced in Step S33.

<Top Perspective View Image and Top Plan View Image>

Figure 7:
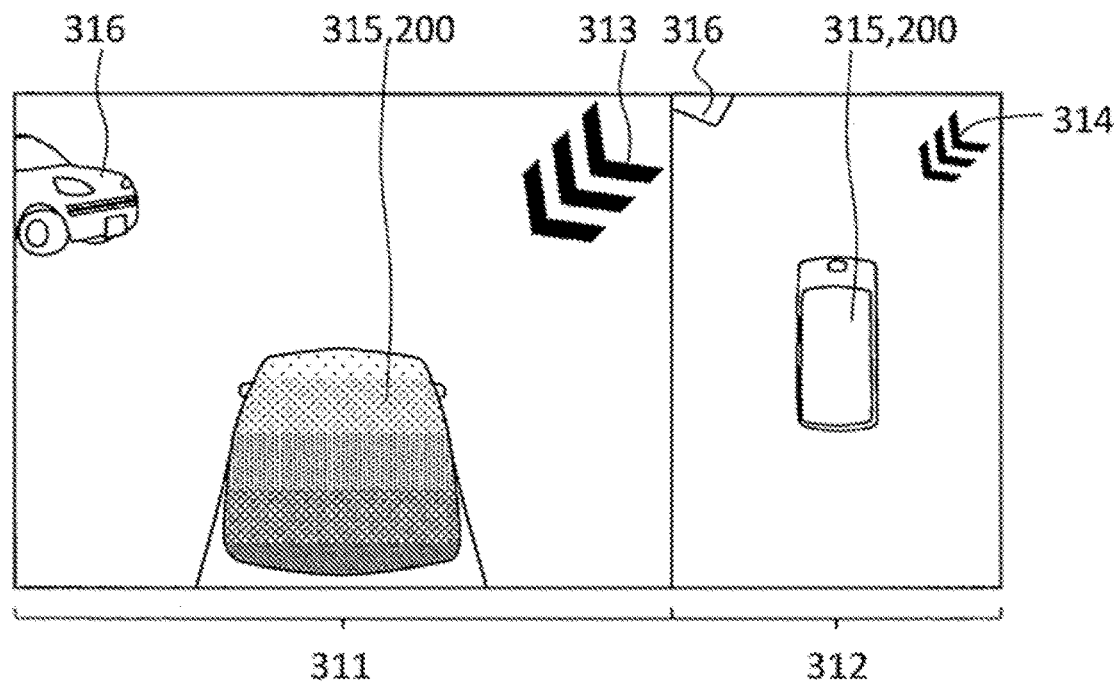
FIG. 7 shows a frontward top perspective view image and a top plan view image of the embodiment

FIG. 7 shows a frontward top perspective view image 311 (three-dimensional view image or three-dimensional image) and a top plan view image 312 (two-dimensional view image or overview image) of the embodiment. The frontward top perspective view image 311 and the top plan view image 312 are displayed side-by-side on the display device 261 (See FIG. 3). The frontward top perspective view image 311 is an image of the vehicle 200 and its surrounding area that are seen from a viewing point rearward and upward of the vehicle 200. The frontward top perspective view image 311 includes images of an area frontward of the vehicle 200, an area on the right side of and frontward of the vehicle 200 and an area on the left side of and frontward of the vehicle 200 as well as an image of the vehicle 200 that is a driver's vehicle 315. The image of the driver's vehicle 315 shows a portion of the driver's vehicle frontward of rear glass.

The obstacle direction marks 313, 314 in FIG. 7 indicate that there is an obstacle that is detected as being present in an area on the right side of and frontward of the vehicle 200 that is a driver's vehicle 315 and approaching the vehicle 200, although the obstacle is not included (not shown) in any of the frontward top perspective view image 311 and the top plan view image 312. To be specific, the obstacle direction marks 313, 314 warn a driver of an obstacle that is present in an area on the right side of and frontward of the vehicle 200, within the predetermined distance from the vehicle 200 and out of the area shown by frontward top perspective view image 311 and the top plan view image 312, is approaching the vehicle 200 (interfering with the vehicle running). A vehicle 316 is also an indicative object within the predetermined distance from the vehicle 200 and is detected by the LIDAR group 240. However, the vehicle 316 is shown in the frontward top perspective view image 311 and the top plan view image 312. Therefore, there is no object direction mark for the vehicle 316 shown in the frontward top perspective view image 311 and the top plan view image 312.

Figure 8:
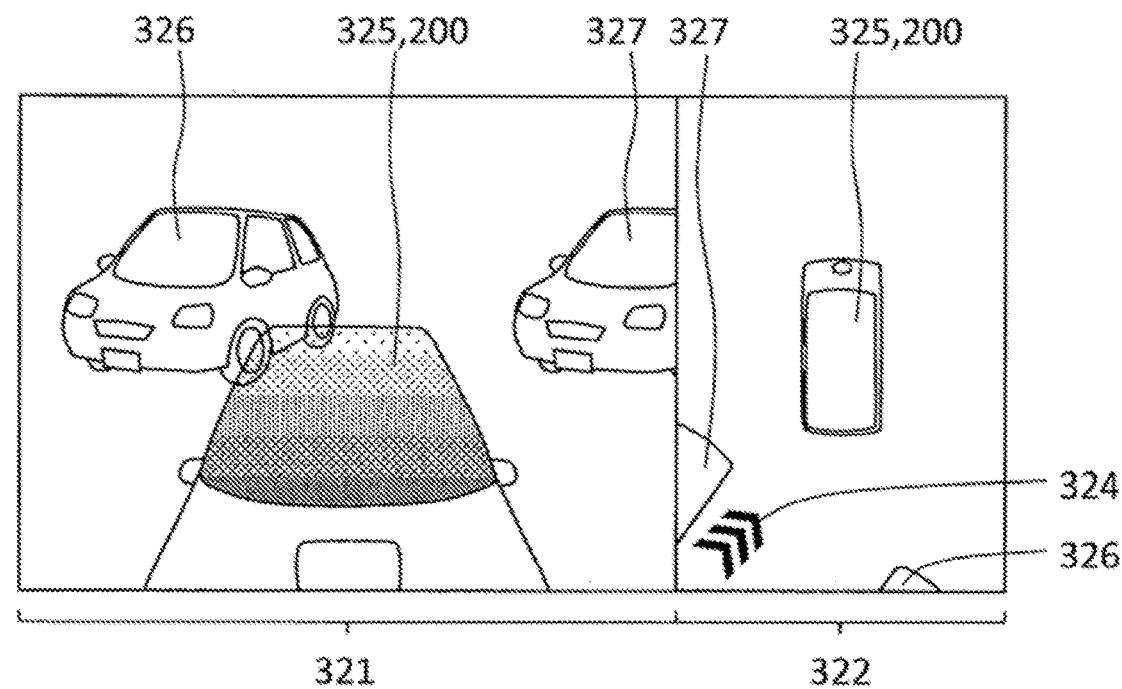
FIG. 8 shows a rearward top perspective view image and a top plan view of the embodiment.

FIG. 8 shows a rearward top perspective view image 321 and a top plan view 322 of the embodiment. The rearward top perspective view image 321 and the top plan view 322 are displayed side-by-side on the display device 261 (See FIG. 3). The rearward top perspective view image 321 is an image of the vehicle 200 and its surrounding area that are seen from a viewing point frontward and upward of the vehicle 200. The rearward top perspective view image 321 includes images of an area rearward of the vehicle 200, an area on the right side of and rearward of the vehicle 200 and an area on the left side of and rearward of the vehicle 200 as well as an image of the vehicle 200 that is a driver's vehicle 325. The rearward top perspective view image 321 shows only a portion of the driver's vehicle 325 frontward of the bonnet.

A portion of the driver's vehicle 325 is made translucent so that an area surrounding the driver's vehicle 325 can be seen through the portion.

Looking at the rearward top perspective view image 321 in FIG. 8, a portion of a left side of the vehicle 326, a portion of a front-left wheel of the vehicle 326 and a portion of a rear-left wheel of the vehicle 326 are seen through the translucent portion of the driver's vehicle 325. Here, the image seen through the translucent portion is an image taken by the camera 213 attached to the rear side of the vehicle 200. A surrounding area of the driver's vehicle 315 is seen through a portion of the driver's vehicle 315 that is made translucent also in the frontward top perspective view image 311 (See FIG. 7) in the same way as the driver's vehicle 325 in the rearward top perspective view image 321.

The obstacle direction mark 324 in FIG. 8 indicates that an obstacle approaching the vehicle 200 is detected in an area on the left side of and rearward of the vehicle 200 being a driver's vehicle 325.

To be specific, the obstacle direction mark 324 warns a driver of an obstacle that is present in an area on the left side of and rearward of the vehicle 200, within the predetermined distance from the vehicle 200 and out of the area shown by the rearward top perspective view image 321 and the top plan view 322, and is approaching the vehicle 200 (could interfere with the direction in which the vehicle 200 running). The vehicles 326, 327 are indicative objects that are present within the predetermined distance from the vehicle 200 and detected by the LIDAR group 240. However the vehicles 326, 327 are shown in the rearward top perspective view image 321 and the top plan view 322. Therefore, there is no obstacle direction mark for any of the vehicles 326, 327 shown in the top plan view 322.

It should be noted that no obstacle direction mark is indicated in the rearward top perspective view image 321 even if there is an obstacle that is present within the predetermined distance from the vehicle 200 and out of the area shown by rearward top perspective view image 321 and the top plan view 322.

<Features of Vehicle Surrounding Area Monitoring System>

A first feature of the vehicle surrounding area monitoring system 10 is that the vehicle surrounding area monitoring system 10 displays on the display device 261 the frontward top perspective view image 311 into which images of the surrounding area of the vehicle 200 are synthesized, when the vehicle 200 is running frontward. In addition, the vehicle surrounding area monitoring system 10 displays on the display device 261 the rearward top perspective view image 321 into which images of the surrounding area of the vehicle 200 are synthesized, when the vehicle 200 is running rearward. It should be noted that the viewing point for the top perspective view is switched between one for the vehicle 200 running frontward and the other for the vehicle 200 running rearward, which enables a driver to easily recognize the state of the surrounding area toward which the vehicle 200 is running.

A second feature of the vehicle surrounding area monitoring system 10 is that the rearward top perspective view image 321 does not show an obstacle direction mark, even if there is an obstacle. Hereinafter, the reason for this feature is explained.

Figure 9:
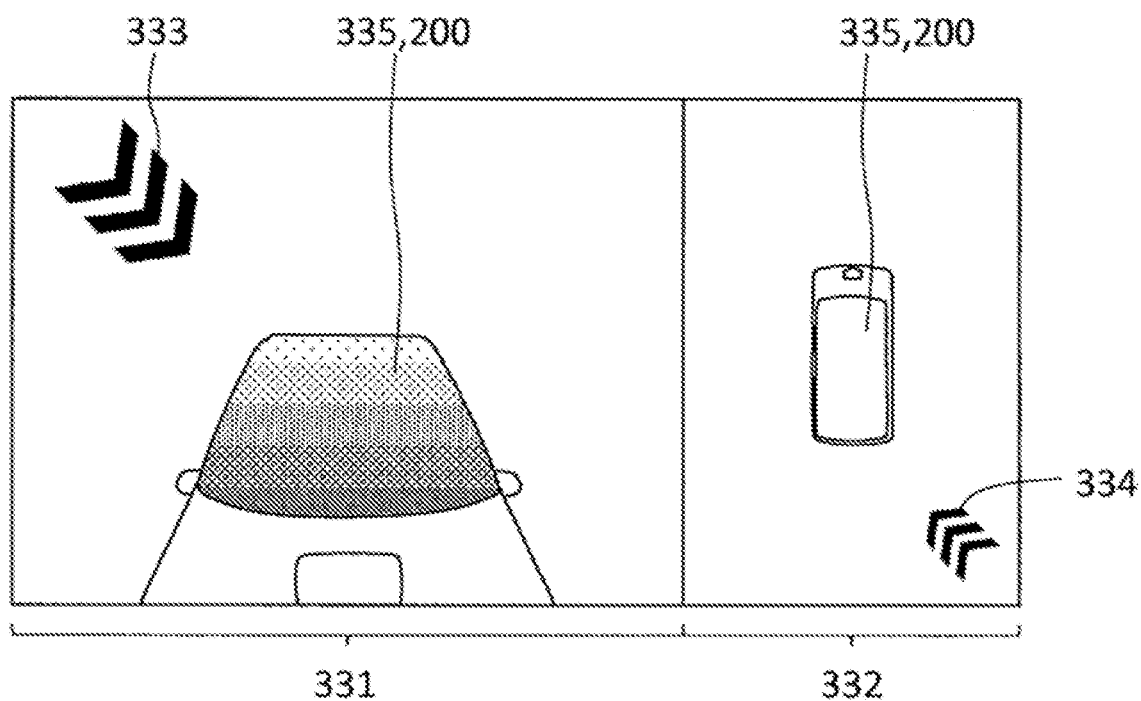
FIG. 9 is a rearward top perspective view image with a direction mark of an obstacle, which is different from the rearward top perspective view image of the embodiment.

FIG. 9 shows a rearward top perspective view image 331 showing an obstacle direction mark 333, which is different from the rearward top perspective view image 321 of the embodiment. The rearward top perspective view image 331, which is different from the rearward top perspective view image 321 shown in FIG. 8, indicates an obstacle direction mark 333. The obstacle direction mark 333 warns a driver of an obstacle being present in an area on the right side of and rearward of the vehicle 200 that is a driver's vehicle 335. A top plan view image 332 shows an obstacle direction mark 334 for the same obstacle.

As shown in FIG. 9, the obstacle is located actually in an area on the right side of the vehicle 200 while the obstacle direction mark 333 is shown at the left side of the rearward top perspective view 331 when the vehicle 200 is running rearward. As a result, the obstacle direction mark 333 is shown at the opposite side of the vehicle 200 in the rearward top perspective view 331, which is the opposite side in the left-right direction of the vehicle 200 to the side of the vehicle 200 on which the area where the obstacle is located is present. Accordingly, if the rearward top perspective view image 331 is displayed on the dis play device 261, the driver could not easily determine on which side of the vehicle 200 the obstacle is present and could be mistaken or confused about the direction of the obstacle.

According to the embodiment, the rearward top perspective view image 321 (See FIG. 8) does not show an obstacle direction mark if there is an obstacle within the predetermined area. Therefore, there is no risk that the driver could be mistaken or confused about the direction of the obstacle.

A third feature is that the top plan view images 312, 322 of the vehicle respectively show the obstacle direction marks 314, 324. Since the left and right directions of the top plan view images 312, 322 correspond respectively to the left and right directions of the driver who is looking at the display device 261, there is no risk that the driver is mistaken or confused about the direction of the obstacle.

The display device 261 displays the frontward top perspective view 311 and the rearward top perspective view image 321 side-by-side respectively with the top plan view image 312 and the top plan view image 321.

There is no difference in the orientation of the driver's vehicles 315, 325 respectively in the top plan view images 312, 322 displayed on the display device 261 between when the driver's vehicle 315 is running frontward and when the driver's vehicle 325 is running rearward. In addition, the top plan view images 312, 322 show the whole surrounding area and further show respectively the obstacle direction marks 314, 324 that indicate the directions of obstacles that are present within the predetermined distance respectively from the driver's vehicles 315, 325 and out of the area shown respectively by the top plan view images 312, 322. Looking at the top plan view images 312, 322, the driver can easily recognize the direction in which the obstacle approaching the driver's vehicle is present and the state around the driver's vehicle.

A fourth feature is that the top plan view images 312, 322 displayed on the display device 261 are smaller respectively than the frontward top perspective view image 311 and the rearward perspective view image 321 displayed on the display device 261. Looking at the frontward top perspective view image 311 and the rearward top perspective view 321 that are intended to mainly show a larger image of the surrounding area in the running direction of the drivers vehicle, the driver can easily recognize the state of the surrounding area in the running direction of the driver's vehicle. In addition, looking at the smaller top plan view images 312, 322, the driver can recognize the state of the whole surrounding area of the driver's vehicle. Furthermore, since the rearward top perspective view image 321 that is a larger image displayed on the display device 261 does not show an obstacle direction mark for an obstacle, there is no risk that the driver could be mistaken or confused about the direction of the obstacle.

MODIFIED EXAMPLE

The present invention should not be limited to the embodiment that has been explained. There is only one ECU included in the vehicle surrounding monitoring unit 100 in the embodiment explained above. However there may be plural ECUs included therein.

The size of the obstacle direction mark may vary depending on the distance to the obstacle. For instance, the longer the distance to the obstacle, the smaller the obstacle direction mark may be, and the shorter the distance to the obstacle, the larger the obstacle direction mark may be.

According to the embodiment described above, the obstacle direction mark is displayed on the display device while the obstacle is present within the predetermined distance from the driver's vehicle. However, displaying the obstacle direction mark may be ended after the obstacle direction mark is continuously displayed for a predetermined duration. In addition, the vehicle surrounding monitoring system 10 may be configured not to show an obstacle direction mark for an obstacle being tracked if the obstacle is moving further away from the driver's vehicle. The obstacle direction mark may have a different shape from the obstacle direction marks 313, 314, 324 and may be displayed flashing.

According to the embodiment as described above, the obstacle is detected with the LIDAR, but it may be detected with other sensor, such as a radar or a sonar.

In the embodiment described above, the driver is seated facing in the vehicle frontward direction. On the other hand, for example, if the driver is seated facing an opposite direction to the direction in which the vehicle is running frontward, the obstacle direction mark (indicating a direction of an indicative object) is not shown in the frontward top perspective view image. To be specific, the display device is disposed facing the driver and the obstacle direction mark is indicated in either the frontward top perspective view image or the rearward perspective view image, depending on in which direction the driver is facing. The vehicle surrounding area monitoring system 10 displays the obstacle direction mark in the rearward top perspective view image and does not display it in the frontward top perspective view, if the driver is seated facing an opposite direction to the direction in which the vehicle is running.

In the embodiment described above, the top perspective view image is displayed when the MVC switch 251 is on or when the shift lever is at a rearward position. In addition to these cases, the top perspective view image may be displayed when an automatic parking function of the vehicle is working. To be specific, the vehicle surrounding area monitoring system 10 may display either the frontward top perspective view image or the rearward top perspective view image, depending on the direction in which the vehicle is running while the automatic parking function is working. For instance, the MVC switch 251 is automatically switched on in conjunction with the automatic parking function starting to work.

In the embodiment described above, the vehicle surrounding area monitoring system 10 displays the top perspective view on the display device installed on the vehicle, but may display it on a display device that is not installed on the vehicle such as a tablet terminal device or a smart-phone. Whether the display device faces the direction in which the vehicle is running or the opposite direction to it may be determined by the direction in which the display device is disposed when the display device is installed on the vehicle and determined based on an output of such a sensor as a gyro sensor or a tilt sensor that is built in the display device that is not installed on the vehicle. The vehicle surrounding system monitoring system 10 determines whether it is appropriate to display the obstacle direction mark, depending on the direction that the display device faces relative to the direction in which the vehicle is running.

What is claimed is:

1. A vehicle surrounding area monitoring device comprising a processor that comprises;
    a top perspective view image producing section synthesizing images of a surrounding area of a vehicle taken by plural imaging devices into a top perspective view image of the vehicle and the surrounding area of the vehicle that are seen from a viewing point obliquely upward of the vehicle and displaying the top perspective view image on a display device; and
    a running direction information receiving section receiving information on a running direction of the vehicle from a control device to control the vehicle to run either frontward or rearward,
    wherein the top perspective view image producing section produces a frontward top perspective view image of the vehicle and the surrounding area of the vehicle that are seen from a first viewing point upward and rearward of the vehicle when the vehicle is running frontward, and produces a rearward top perspective view image of the vehicle and the surrounding area of the vehicle that are seen from a second viewing point upward and frontward of the vehicle when the vehicle is running rearward.

2. The vehicle surrounding area monitoring device as claimed in claim 1, wherein the processor further comprises an indicative object information receiving section receiving information on an indicative object present in the surrounding area of the vehicle, and wherein if the indicative object information receiving section receives the information on the indicative object approaching the vehicle, the top perspective view image producing section superimposes an direction image for the indicative object on the frontward top perspective view image when the vehicle is running frontward and does not superimpose the direction image for the indicative object on the rearward top perspective view image when the vehicle is running rearward.

3. The vehicle surrounding area monitoring device as claimed in claim 2, wherein the processor further comprises a top plan view producing section synthesizing the images of the surrounding area of the vehicle into a top plan view of the vehicle and the surrounding of the vehicle that are seen from a third viewing point upward of the vehicle, and wherein the top plan view producing section superimposes the direction image for the indicative object when the vehicle is running frontward as well as when the vehicle is running rearward.

4. The vehicle surrounding area monitoring device as claimed in claim 3, wherein the vehicle is seen present at a center portion in the top plan view image and the vehicle in the top plan view image is kept in a predetermined orientation, whether the vehicle is running frontward or rearward.

5. The vehicle surrounding area monitoring device as claimed in claim 3, wherein the top plan view image displayed on the display device is smaller than the top perspective view image displayed on the display device.

6. A vehicle provided with the vehicle surrounding area monitoring device as claimed in claim 1, wherein the display device is disposed opposite a driver seated at a driver seat.

7. A non-transitory storage medium storing a program for having a computer function as the vehicle surrounding area monitoring device as claimed in claim 1.

8. A vehicle surrounding area monitoring method performed by a vehicle surrounding area monitoring device comprising;
  a top perspective view producing step of taking images of a surrounding area of a vehicle with plural imaging devices, synthesizing the images into a top perspective view image of the vehicle and the surrounding area of the vehicle that are seen from a viewing point obliquely upward of the vehicle and displaying the top perspective view image on a display device; and
  a vehicle running direction information receiving step of receiving vehicle running direction information from a control device to control the vehicle to run frontward or rearward;
  wherein in the top perspective view producing step, a frontward top perspective view image of the vehicle and the surrounding area of the vehicle that are seen from a first viewing point upward and rearward of the vehicle is produced when the vehicle is running frontward and a rearward top perspective view image of the vehicle and the surrounding area of the vehicle that are seen from a second viewing point upward and frontward of the vehicle is produced when the vehicle is running rearward.

\* \* \* \* \*